United States Patent [19]
Cochran et al.

[11] Patent Number: 5,553,098
[45] Date of Patent: Sep. 3, 1996

[54] DEMODULATOR WITH SELECTABLE COHERENT AND DIFFERENTIAL DATA

[75] Inventors: Bruce A. Cochran, Mesa; John M. Liebetreu; Ronald D. McCallister, both of Scottsdale, all of Ariz.

[73] Assignee: Sicom, Inc., Scottsdale, Ariz.

[21] Appl. No.: 226,669

[22] Filed: Apr. 12, 1994

[51] Int. Cl.$^6$ .................................................. H04L 27/14
[52] U.S. Cl. ..................... 375/324; 375/279; 375/308; 375/325; 375/329; 375/330; 329/304; 455/143
[58] Field of Search ................................. 375/261, 271, 375/279, 283, 322, 324, 328, 329, 330; 329/304, 306, 371, 300; 455/142, 143

[56] References Cited

U.S. PATENT DOCUMENTS

| | | | |
|---|---|---|---|
| 4,290,140 | 9/1981 | Malm | 375/323 |
| 4,438,524 | 3/1984 | Muilwijk | 375/80 |
| 4,818,931 | 4/1989 | Naegeli et al. | 324/77 |
| 4,933,958 | 6/1990 | Brandl et al. | 375/85 |
| 5,007,068 | 4/1991 | Simon et al. | 375/53 |
| 5,097,220 | 3/1992 | Shimakata et al. | 329/306 |
| 5,121,070 | 6/1992 | Tomita | 329/304 |
| 5,311,545 | 5/1994 | Critchlow | 375/324 |
| 5,377,229 | 12/1994 | Wilson et al. | 375/9 |

OTHER PUBLICATIONS

N. Liskov and R. Curtis "Performance of Coherent Phase and Amplitude Digital Modulaitions with Carrier Recovery Noise" IEEE Transactions on Communications, vol. Com–35, No. 9, Sep. 1987.

Justin C.–I. Chuang "Comparison of Coherent and Differential Detection of BPSK and QPSK in a Quasistatic Fading Channel" IEEE Transactions on Communications, vol. 38, No. 5, May 1990 p. 565.

M. Simon and D. Duvsakar "Doppler–Corrected Differential Detection of MPSK" IEEE Transactions of Communications, vol. 37, No. 2, Feb. 1989.

P. Ho and D. Fung "Error Performance of Multiple–Symbol Differential Detection of PSK Signals Transmitted Over Correlated Rayleigh Fading Channels" IEEE Transactions on Communications, vol. 40, No. 10 Oct. 1992.

D. Divsalar and M. Simon "Multiple–Symbol Differential Detection of MPSK" IEEE Transactions on Communications, vol. 38, No. 3, Mar. 1990.

M. Fitz and W. Lindsey "Decision–Directed Bust–Mode Carrier Synchronization Techniques" IEEE Transactions On Communications, vol. 40, No. 10, Oct. 1992.

J. Proakis, P. Drouilhet and R. Price "Performance of Coherent Detection Systems Using Decision–Directed Channel Measurement" IEEE Transactions Communications, Mar. p. 54.

A. Aghamohammadi, H. Meyr and G. Ascheid "Adaptive Synchronization and Channel Parameter Estimation Using an Extended Kalman Filter" IEEE Transactions Communications, vol. 37, No. 11, Nov. 1989.

T. Alberty and V. Hespelt "A New Pattern Jitter Free Frequency Error Detector" IEEE Transactions on Communications, vol. 37, No. 2, Feb. 1989.

Pooi Yuen Kam "Maximum Likelihood Carrier Phase Recovery for Linear Suppressed–Carrier Digital Data Modulations" IEEE Transactions on Communications, vol. Com–34, No. 6, Jun. 1986.

*Primary Examiner*—Stephen Chin
*Assistant Examiner*—Amanda T. Le
*Attorney, Agent, or Firm*—Lowell W. Gresham; Jordan M. Meschkow; Mark M. Takahashi

[57] ABSTRACT

A selectable demodulator (32) operates in the phase domain to implement a coherent demodulation path (40) and a differentially coherent demodulation path (42). The coherent path (40) includes a differential encoder circuit (46) to produce coherently demodulated differential data. Magnitude converters (62, 62') convert phase errors in each path into magnitude values. A comparison circuit (66) compares magnitude values from the two paths (40, 42) and selects the path encountering the least phase error. A selection circuit (60) provides data codes demodulated in accordance with the selection.

20 Claims, 3 Drawing Sheets

DEMODULATOR WITH SELECTABLE COHERENT AND DIFFERENTIAL DATA

TECHNICAL FIELD OF THE INVENTION

The present invention relates generally to digital communications. More specifically, the present invention relates to digital demodulators.

BACKGROUND OF THE INVENTION

In the field of digital communications, a need exists to successfully communicate digital data with lower signal-to-noise ratios. At lower signal-to-noise ratios, less power is consumed and/or communications take place over greater distances at given bit error rates. Alternatively, if power levels and communication ranges remain constant, the ability to distinguish signals from noise improves and bit error rates improve.

Coherent demodulation and differentially coherent demodulation, or simply differential demodulation, are conventional techniques used for retrieving data conveyed by a carrier signal. Between the two techniques, coherent demodulation typically achieves a 1–3 dB improvement in performance. Generally speaking, during each symbol coherent demodulation retrieves data from a carrier signal by comparing a phase relationship between the signal's quadrature components with an absolute phase reference. Differential demodulation uses a phase reference established by the phase relationship detected in a previous symbol. Noise influences only the carrier signal's phase relationship and not the absolute phase reference in coherent demodulation. Noise influences both the carrier signal's phase relationship and the phase reference in differential demodulation. This doubling of the noise influence causes differential demodulation to exhibit poorer performance than coherent demodulation.

In spite of coherent demodulation's improved performance, more and more digital communication systems rely upon differential demodulation. Differential demodulation is useful because of difficulties in establishing and maintaining the absolute phase reference required for coherent demodulation. In particular, coherent demodulation requires the communication of many symbols of dummy or preamble data in order to establish the absolute phase reference. During this acquisition period, detected data are typically too error prone to be useful. In burst communication applications, the overhead burden of a sufficient number of acquisition symbols is intolerable.

Moreover, coherent demodulation suffers in robustness when compared to differential demodulation. When a carrier signal experiences a significant phase perturbation during an on-going stream of communication, such as from significant Doppler, multipath or interference, coherent demodulation may operate for a period of time on an invalid estimate of the absolute phase reference. This period may continue for a relatively long time until a more accurate absolute phase reference is established. During this period a significant number of data errors may be produced. On the other hand, when differential demodulation experiences such a perturbation, data errors are produced for only a single or a few symbols.

The advantages of differential demodulation when compared to coherent demodulation have lead to efforts to devise alternate demodulation schemes that exhibit improved performance. For example, maximum likelihood and decision-directed schemes have been devised in an attempt to achieve the performance of coherent demodulation with the rapid acquisition characteristics and robustness of differential demodulation. However, such schemes typically require complex implementations and in some cases result in performance which can be even worse than differential demodulation.

SUMMARY OF THE INVENTION

Accordingly, it is an advantage of the present invention that an improved digital demodulator is provided.

Another advantage of the present invention is that a digital demodulator is provided which determines whether coherent or differentially coherent demodulation yields better performance for a given situation.

Another advantage is that the present invention provides data detected in accordance with differential demodulation or data detected in accordance with coherent demodulation.

Another advantage is that the present invention may be implemented using a simple architecture.

Another advantage is that the present invention provides rapid acquisition and robust tracking.

Another advantage is that the present invention achieves bit error rate performance at least as good as differential demodulation in all circumstances and often achieves performance at least equivalent to coherent demodulation.

The above and other advantages of the present invention are carried out in one form by an apparatus for demodulating a carrier signal that has been differentially modulated to convey a stream of digital data symbols. The apparatus includes a first data detector that is responsive to the carrier signal and is configured to produce differentially demodulated data. A second data detector is also responsive to the carrier signal and is configured to produce coherently demodulated data. A selecting device couples to the first and second data detectors. The selecting device selects between the differentially demodulated and coherently demodulated data.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
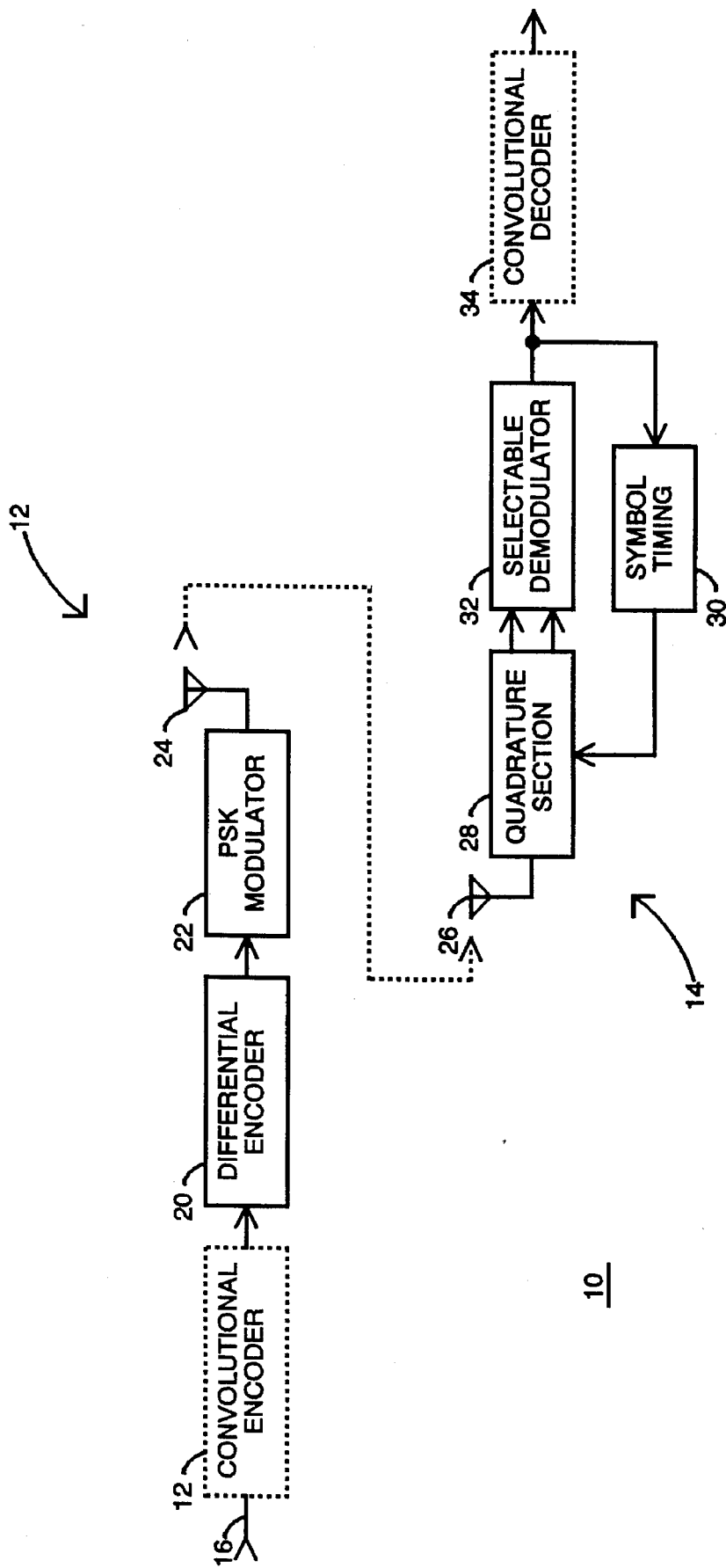
FIG. 1 shows a block diagram of a communication system which may employ a selectable demodulator configured in accordance with the teaching of the present invention.

FIG. 1 shows a block diagram of a communication system 10. System 10 includes a transmitter 12 and a receiver 14. Transmitter 12 receives a stream of data from a data bus 16. These data may be routed through a convolutional encoder 18.

FIG. 1 depicts convolutional encoder 18 as a dotted-line box because it is an optional feature of transmitter 12. When present in transmitter 12, convolutional encoder 18 encodes the data stream and adds overhead data in a manner known to those skilled in the art so that errors occurring in a version of the data stream reconstructed by receiver 14 may be detected and corrected. However, the ability of receiver 14 to detect and correct errors may be limited to only a relatively small amount of error, and an ability to correct greater amounts of error requires convolutional encoder 18 to add greater amounts of overhead data to the data stream.

The data stream, whether convolutionally encoded or not, passes on to a differential encoder 20. Differential encoder 20 encodes the data stream so that each element of information from the data stream, where an element of information is expressed by one or more bits of data, is defined in terms of change in data content from the immediately previous element.

Differential encoder 20 couples to a phase shift keyed (PSK) modulator 22. The differentially encoded data from encoder 20 are modulated by selecting a phase angle from a predetermined alphabet of phase angles. For BPSK modulation the alphabet contains two phase angles, for QPSK modulation the alphabet contains four phase angles, and so on. A phase angle is selected from the alphabet in response to the value expressed by a data element. Quadrature components of a carrier signal are generated so that they exhibit a phase relationship equivalent to the selected phase angle. The carrier signal is then transmitted, such as through an antenna 24.

As each element of data is presented to PSK modulator 22, the carrier signal transmitted from modulator 22 exhibits a corresponding modulated phase relationship between its quadrature components. Accordingly, the carrier signal conveys a stream of differentially modulated symbols, where a symbol represents the period of time required to transmit one element of information. During a current symbol, the modulated phase relationship between quadrature components of the carrier signal transitions between past and future phase relationships through the phase relationship selected for the current symbol.

Receiver 14 receives this carrier signal, such as at an antenna 26. Antenna 26 couples to a quadrature section 28 of receiver 14. Quadrature section 28 performs initial signal processing on the carrier signal. For example, an RF section may amplify, filter, and down-convert the carrier signal to baseband. In addition, the carrier signal is broken into its I and Q quadrature components. In the preferred embodiment of the present invention, the I and Q components are digital values. Hence, analog-to-digital (A/D) converters (not shown) are used to sample the carrier signal after amplification and bandpass filtering. Quadrature section 28 couples to a symbol timing section 30, which provides timing signals that control the instants during each symbol when A/D conversions take place. The preferred embodiment uses a well known Hilbert transformation technique to convert the sampled carrier signal into I and Q quadrature data values, but any other technique known to those skilled in the art may be used as well. These I and Q data values express I and Q quadrature components in accordance with a rectilinear coordinate system.

Quadrature section 28 couples to a selectable demodulator 32. Selectable demodulator 32 operates upon a stream of I and Q quadrature values received from quadrature section 28. The I and Q quadrature values are updated each symbol. Selectable demodulator 32 selects a best choice for a given situation between coherent and differentially coherent demodulation. Differentially coherent demodulation is referred to as differential demodulation below for simplicity. In addition, selectable demodulator 32 performs demodulation in accordance with the selection and supplies a stream of data codes in accordance with the selection.

For example, when receiver 14 begins to receive the carrier signal, it receives start-of-signal symbols. During this period, coherent demodulation is a poor choice because no opportunity has been provided to establish an absolute, or coherent, phase reference to use in evaluating the received phase relationships expressed by the I and Q quadrature values. Consequently, selectable demodulator 32 selects differential demodulation and supplies data determined through differential demodulation of the carrier signal, as expressed in the I and Q quadrature values.

However, after a sufficient number of symbols, often in the hundreds or thousands, have been received, an absolute phase reference may be established. At this point, coherent demodulation is the better choice because the absolute phase reference is less influenced by noise in the data link than a differential phase reference. Thus, selectable demodulator 32 then selects coherent demodulation and supplies data determined through coherent demodulation of the carrier signal. Since the data stream was differentially encoded by encoder 20, these coherently demodulated data are differentially coded to maintain compatibility with the modulation coding.

As the data stream continues, selectable demodulator 32 is free to alternate between coherent and differential demodulation. Thus, when perturbations, such as multipath, Doppler, unusual noise effects, and the like, introduce significant phase errors into the carrier signal, selectable demodulator 32 switches back to differential demodulation when it is the better choice and later switches back again to coherent demodulation when carrier signal phase synchronization is re-acquired.

Selectable demodulator 32 couples to symbol timing section 30 so that symbol timing section 30 may determine symbol framing. In addition, selectable demodulator 32 couples to an optional convolutional decoder 34. Convolutional decoder 34 performs a complimentary function to convolutional encoder 18, discussed above. Thus, when encoder 18 and decoder 34 are included, a limited amount of data errors may be removed from the stream of data codes supplied by selectable demodulator 32.

Figure 2:
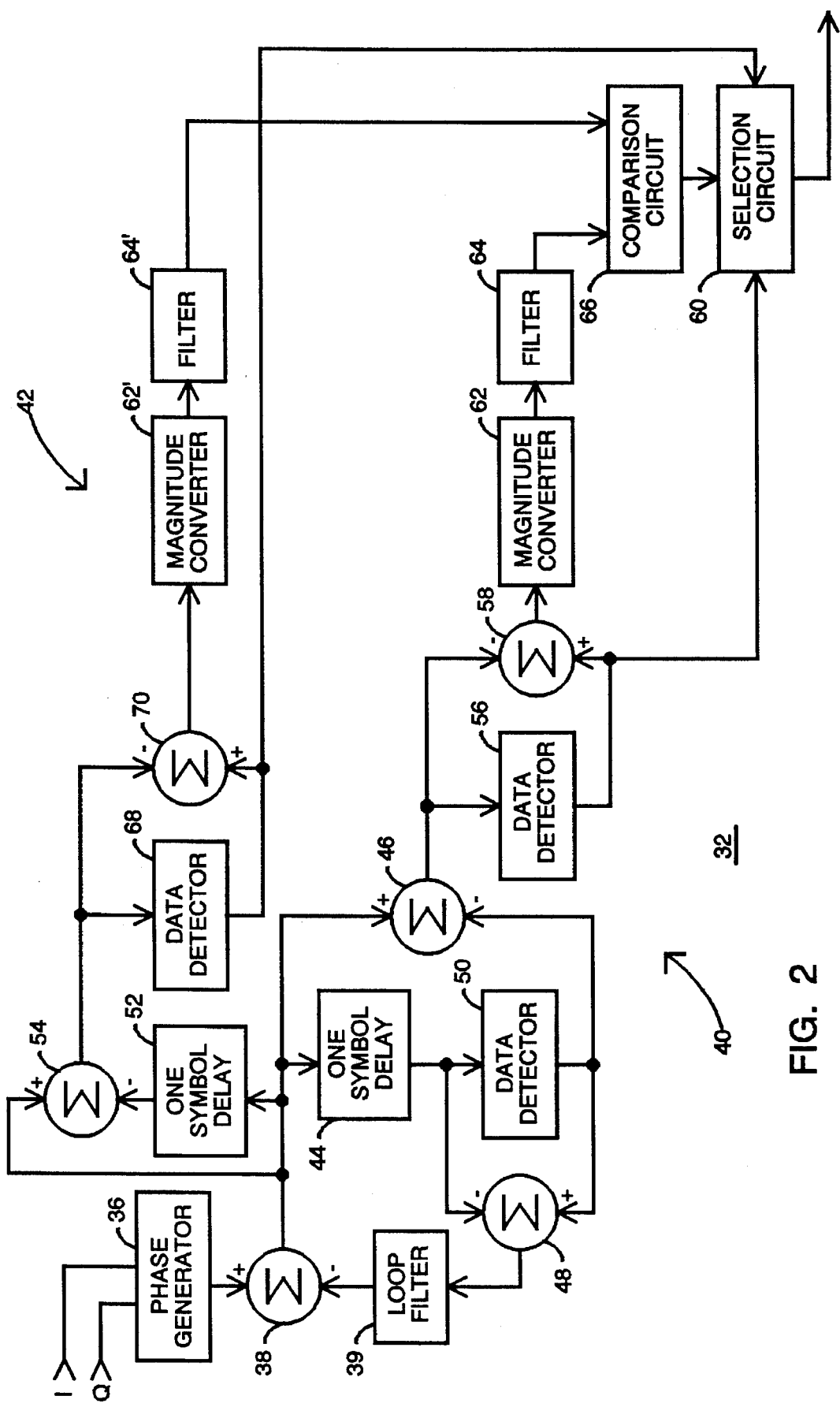
FIG. 2 shows a block diagram of a first embodiment of the selectable demodulator.
Figure 3:
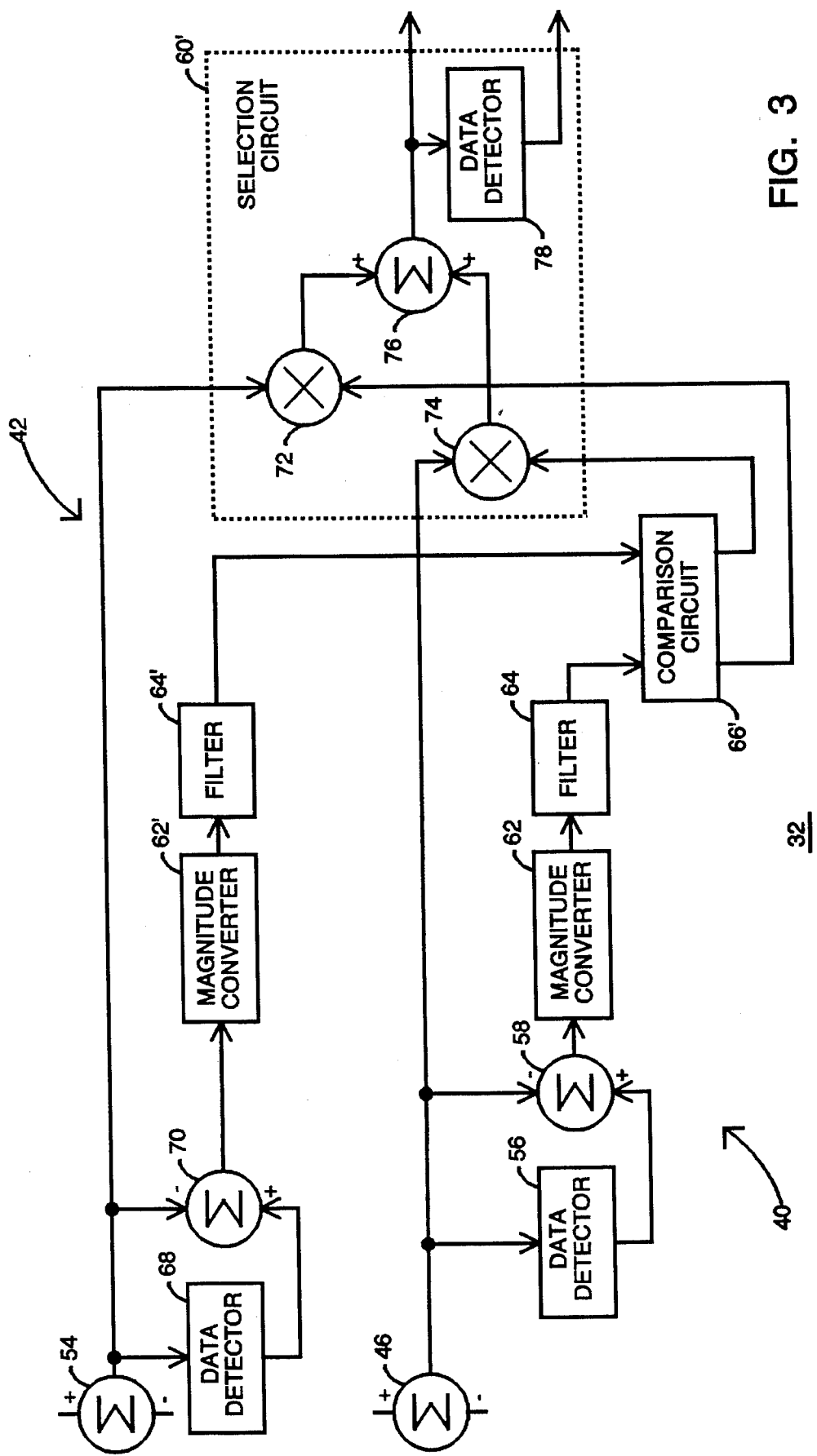
FIG. 3 shows a block diagram of a second embodiment of the selectable demodulator.

Selectable demodulator 32 is discussed in more detail in connection with FIGS. 2 and 3. FIG. 2 shows a block diagram of a first embodiment of selectable demodulator 32, and FIG. 3 shows a block diagram of a second embodiment of selectable demodulator 32.

With reference to FIG. 2, the stream of I and Q quadrature values from quadrature section 28 (see FIG. 1) are presented to a phase generator 36. Phase generator 36 generates data describing phase angles represented by the I and Q quadrature values. In the preferred embodiment, a Cordic conversion process is used in making the conversions, but those skilled in the art can adapt other techniques, such as table look-ups and the like, in particular applications. Phase generator 36 generates one phase value for each symbol. An output of phase generator 36 couples to a first input of a subtraction circuit 38.

Subtraction circuit 38 operates as a phase error compensator. An output of a loop filter 39, which couples to a second input of subtraction circuit 38, provides an absolute or coherent phase reference. Thus, an output of subtraction circuit 38 generates a received phase relationship for a current symbol of the carrier signal, compensated by the absolute phase reference. In other words, the received phase relationship for the current symbol represents the difference between the absolute phase reference and the phase represented by the I and Q quadrature values.

The received phase relationship value from subtraction circuit 38 drives both a coherent demodulation path 40 and a differential demodulation path 42. The output of subtraction circuit 38 couples to an input of a one symbol delay element 44 and a first input of a subtraction circuit 46 in coherent path 40. An output of delay element 44 couples to a first input of a subtraction circuit 48 and to an input of a data detector 50. An output of data detector 50 couples to second inputs of subtraction circuits 48 and 46, and an output of subtraction circuit 48 couples to an input of loop filter 39.

Data detector 50 produces coherently demodulated data codes. These data codes are valid for the symbol immediately preceding the current symbol due to the operation of one symbol delay element 44. Data detector 50 and other data detectors discussed below are decision circuits that convert a received phase value into estimates of the modulation phase selected from the alphabet of modulation phase angles discussed above in connection with FIG. 1. The output modulation phase value is the one from the alphabet which most closely matches the received phase value.

In general, the received phase value has been corrupted through noise and/or other errors, and data detector 50 removes the noise and errors so that the original modulation phase is restored. Subtraction circuit 48 is a phase error detector that quantifies the amount of noise or error removed by data detector 50. This phase error is filtered through loop filter 39 and fed back to the phase error compensator formed by subtraction circuit 38 to complete a phase locked loop. The preferred embodiments of the present invention configure loop filter 39 with parameters that make a narrow bandwidth filter having a time constant on the order of hundreds or thousands of symbols. The use of a narrow bandwidth is desirable for coherent operation because it reduces phase jitter. On the other hand, the narrow bandwidth nature of loop filter 39 makes selectable demodulator 32 process hundreds or thousands of symbols before a valid absolute or coherent phase reference is available at the output of loop filter 39. Once this coherent phase reference is accurately established, data detector 50 may then successfully process the phase difference between the coherent phase reference and the received phase defined by the I and Q quadrature values.

Subtraction circuit 46 is a differential encoder. Subtraction circuit 46 determines the difference between the modulated phase estimates from data detector 50, which are valid for the previous symbol, and the received phase relationship for the current symbol. Thus, subtraction circuit 46 supplies an estimate of the modulated phase for the current symbol that is consistent with differential modulation. While the received phase for the current symbol is corrupted by noise and other error, such noise and error have been removed from the previous symbol's phase through data detector 50. Thus, the modulated phase relationship for the current symbol supplied by subtraction circuit 46 carries only one symbol's worth of noise and error and corresponds to coherent demodulation.

With respect to differential path 42, the output of subtraction circuit 38 couples to an input of a one symbol delay element 52 and to a first input of a subtraction circuit 54. One symbol delay element 52 and subtraction circuit 54 together form a differential data detector. The data output from subtraction circuit 54 represents the difference in received phase values between the current and previous symbols. Since both the current and previous phase values are corrupted by noise and error, this phase difference carries two symbols' worth of noise and error.

Starting at the outputs of subtraction circuits 46 and 54, coherent and differential paths 40 and 42 have similar architectures. For coherent path 40, the output of subtraction circuit 46 couples to an input of a data detector 56 and to a first input of a subtraction circuit 58. An output of data detector 56 couples to a second input of subtraction circuit 58 and to a first data input of a selection circuit 60. An output of subtraction circuit 58 couples to an input of a magnitude converter 62, and an output of magnitude converter 62 couples to an input of a smoothing filter 64. An output of filter 64 couples to a first input of a comparison circuit 66, and an output of comparison circuit 66 couples to a control input of selection circuit 60. A data output from selection circuit 60 serves as the output from selectable demodulator 32.

For differential path 42, the output of subtraction circuit 54 couples to an input of a data detector 68 and to a first input of a subtraction circuit 70. An output of data detector 68 couples to a second input of subtraction circuit 70 and to a second data input of selection circuit 60. An output of subtraction circuit 70 couples to an input of a magnitude converter 62' and an output of magnitude converter 62' couples to an input of a smoothing filter 64'. An output of filter 64' couples to a second input of comparison circuit 66.

Each of data detectors 56 and 68 receives a differentially encoded, "received" phase for the current symbol. However, the differentially encoded phase fed to data detector 56 is generated in response to coherently demodulated data. Data detectors 56 and 68 produce differentially demodulated data. However, the differential data generated at data detector 56 is produced in response to the coherently demodulated data. These data represent coherently demodulated differential data.

Subtraction circuits 58 and 70 are phase error detectors. They identify the noise and error removed by data detectors 56 and 68, respectively. Subtraction circuit 58 generates coherent demodulation phase errors while subtraction circuit 70 generates differential demodulation phase errors. These phase errors are typically signed values. In other words, they may be either positive or negative values. Magnitude converters 62 and 62' convert the signed values into corresponding unsigned magnitude values by performing an absolute value operation, squaring operation, or the like. Magnitude converter 62 converts to coherent phase error magnitude values while magnitude converter 62' converts to differential phase error magnitude values. Smoothing filters 64 and 64' filter out extreme phase error magnitude values. Filters 64 and 64' may be implemented using a moving average operation that evaluates, for example, eight or sixteen symbols.

Comparison circuit 66 evaluates the magnitude of phase errors generated in coherent path 40 and differential path 42 and controls selection circuit 60 in response to the evaluation. While comparison circuit 66 and selection circuit 60 may be more complex, they may be implemented using only a comparator and multiplexer, respectively. Generally speaking, demodulated data from the one of paths 40 and 42 that has the lowest phase error magnitude is selected. Both paths provide differential demodulated data, but the paths provide different versions of the modulated data stream transmitted by transmitter 12 (see FIG. 1). The path that generates the lower phase error magnitudes is the better choice and provides better quality data.

As an example, when start-of-signal symbols are received or when a perturbation in the communication link causes a significant phase shift so that phase synchronization is lost by phase error compensator 38, coherent path 40 generally produces higher errors because the coherent reference provided by loop filter 39 is incorrect. During these situations, differential path 42 produces lower errors because after one symbol has been received a valid phase reference is established. Thus, in these situations comparison circuit 66 and selection circuit 60 select the data codes produced by data detector 68 in differential path 42 as being the better version of the modulated data stream.

Conversely, as more and more symbols are received, the coherent phase reference provided by loop filter 39 becomes accurate. When this happens, coherent path 40 produces lower errors because the received phase relationships processed by data detector 56 are corrupted by only one symbol's worth of noise and error while the received phase relationships processed by data detector 68 are corrupted by two symbol's worth of noise and error. Thus in this situation, comparison circuit 66 and selection circuit 60 select the data codes produced by data detector 56 in coherent path 40 as the better version of the modulated data stream. As selectable demodulator 32 continues to process the received data stream, the selection alternates back and forth so that the best quality data are output for every situation.

FIG. 3 shows a block diagram of a second embodiment of selectable demodulator 32. The front ends of the first embodiment shown in FIG. 2 and this second embodiment shown in FIG. 3 are substantially the same. Thus, the blocks of selectable demodulator 32 which reside in front of subtraction circuits 46 and 54 in coherent and differential paths 40 and 42 have been omitted. Likewise, the blocks of selectable demodulator 32 which reside between subtraction circuits 46 and 54 in coherent and differential paths 40 and 42 are substantially the same between the embodiments.

However, a selection circuit 60' and a comparison circuit 66' are slightly more complex versions of selection circuit 60 and comparison circuit 66, respectively (see FIG. 2). In this second embodiment, comparison circuit 66' may be a ratio-producing or division circuit. A first output from comparison circuit 66' may characterize the ratio of the phase error magnitude for coherent path 40 to that of differential path 42 while a second output may characterize the ratio for differential path 42 to coherent path 40.

The first and second outputs of comparison circuit 66' couple to first inputs of multipliers 72 and 74, respectively, in selection circuit 60'. Outputs of subtraction circuits 54 and 46 couple to second inputs of multipliers 72 and 74, respectively. Outputs of multipliers 72 and 74 couple to first and second inputs of an addition circuit 76, and an output of addition circuit 76 couples to an input of a data detector 78. The outputs of addition circuit 76 and data detector 78 provide outputs from selectable demodulator 32.

In this second embodiment, the outputs from comparison circuit 66' provide scale factors that are applied to the received phase values in multipliers 72 and 74. The scaled received phase values are combined in addition circuit 76. Consequently, the received phase value provided by addition circuit 76 represents a combination of the coherent and differential versions of the received phase value. However, this combination is configured to favor the one of paths 40 and 42 that has the lowest phase error magnitude, and the favored path is weighted proportionally to the ratio between the phase error magnitudes in the two paths. This combined received phase value provides soft decision data that are useful in convolutional decoding by convolutional decoder 34 (see FIG. 1). Data detector 78 removes error and noise by choosing the closest phase from the alphabet of modulated phases, and outputs data codes that directly correspond to the modulated phase estimates.

In summary, the present invention provides an improved digital demodulator. The selectable demodulator described herein determines whether coherent or differentially coherent demodulation yields better performance for a given situation. Data detected in accordance with either differential demodulation or coherent demodulation are provided. Due at least in part to performing operations in a phase domain rather than in a rectilinear domain, the present invention may be implemented using a simple architecture. Rapid acquisition and robust tracking are provided by identifying situations in which better performance is achieved through differential demodulation and in generating differentially demodulated data. By identifying situations in which better performance is achieved through coherent demodulation and in generating coherently demodulated data, the present invention improves upon the bit error rate performance of differential demodulation. In fact, the ability to quickly detect situations when coherent demodulation begins to operate with an inaccurate coherent phase reference and to quickly select differential demodulation allows the present invention to improve upon the overall performance of coherent demodulation.

The present invention has been described above with reference to preferred embodiments. However, those skilled in the art will recognize that changes and modifications may be made in these preferred embodiments without departing from the scope of the present invention. For example, the coherent phase error chosen to drive a comparison circuit 66 could originate from subtraction circuit 48 rather than subtraction circuit 58. These and other changes and modifications which are obvious to those skilled in the art are intended to be included within the scope of the present invention.

What is claimed is:

1. An apparatus for demodulating a carrier signal that has been differentially modulated to convey a stream of digital data symbols, said apparatus comprising:

a first data detector responsive to said carrier signal and configured to produce differentially demodulated data;

a second data detector responsive to said carrier signal and configured to produce coherently demodulated data;

means, coupled to said first and second data detectors, for selecting between said differentially demodulated and coherently demodulated data; and a comparison circuit coupled to said first data detector, to said second data detector, and to said selecting means, for evaluating phase errors occurring at said first and second data detectors.

2. An apparatus as claimed in claim 1 wherein:

said first and second data detectors each have an input; and said apparatus additionally comprises a phase generator having an output for generating received phase relationships between quadrature components of said carrier signal, said phase generator output being coupled to said inputs of said first and second data detectors.

3. An apparatus as claimed in claim 2 additionally comprising:

a phase error compensator coupled between said phase generator and said first and second data detectors; and a loop filter coupled between said second data detector and said phase error compensator.

4. An apparatus as claimed in claim 1 wherein:

said second data detector produces a modulated phase relationship estimate of said carrier signal for a previous symbol; and said apparatus additionally comprises means for determining a difference between a received phase relationship of said carrier signal for a current symbol and said modulated phase relationship estimate for said previous symbol.

5. An apparatus as claimed in claim 1 additionally comprising a third data detector coupled between said second data detector and said selecting means, said third data detector being configured to produce differentially encoded data in response to said coherently demodulated data.

6. A method for demodulating a carrier signal that has been modulated to convey digital data, said method comprising the steps of:

receiving said carrier signal;

detecting a first phase error associated with differentially coherent demodulation of said carrier signal;

detecting a second phase error associated with coherent demodulation of said carrier signal;

selecting between said differentially coherent demodulation and said coherent demodulation of said carrier signal in response to said first and second phase error detecting steps; and supplying a stream of data codes in response to said selecting step.

7. A method as claimed in claim 6 wherein:

said receiving step receives a substantially continuous steam of symbols beginning with start-of-signal symbols; and said selecting step selects differentially coherent demodulation while said receiving step receives said start-of-signal symbols and then selects coherent demodulation.

8. A method as claimed in claim 7 wherein said selecting step alternates between selecting coherent demodulation and differentially coherent demodulation while said receiving step receives said stream of symbols.

9. A method as claimed in claim 6 wherein:

said method additionally comprises the step of generating a first version of said data codes with a first data detector;

said method additionally comprises the step of generating a second version of said data codes with a second data detector; and said selecting step is responsive to said first and second versions of said data codes.

10. A method as claimed in claim 9 additionally comprising the step of differentially encoding said second version of said data codes.

11. An apparatus for demodulating a carrier signal that has been differentially modulated to convey a stream of digital data symbols, said apparatus comprising:

a phase generator for generating received phase relationships between quadrature components of said carrier signal;

a first data detector coupled to said phase generator and being configured to produce differentially demodulated data;

a first phase error detector coupled to said phase generator and said first data detector, said first phase error detector generating differential demodulation phase errors;

a second data detector coupled to said phase generator and being configured to produce coherently demodulated data;

a second phase error detector coupled to said second data detector, said second phase error detector generating coherent demodulation phase errors; and means, coupled to said first and second phase error detectors, for selecting between said differentially demodulated and coherently demodulated data.

12. An apparatus as claimed in claim 11 additionally comprising:

means, coupled to said first and second phase error detectors, for converting said differential demodulation phase errors and said coherent demodulation phase errors into differential phase error magnitude values and coherent phase error magnitude values, respectively; and a filter, coupled to said converting means, for smoothing said differential phase error magnitude values and said coherent phase error magnitude values.

13. An apparatus as claimed in claim 11 additionally comprising a comparison circuit coupled to said first phase error detector, to said second phase error detector, and to said selecting means, for evaluating phase errors occurring at said first and second data detectors.

14. An apparatus as claimed in claim 11 additionally comprising:

a phase error compensator coupled between said phase generator and said first and second data detectors; and a loop filter coupled between said second data detector and said phase error compensator.

15. An apparatus as claimed in claim 11 additionally comprising a third data detector coupled between said second data detector and said selecting means, said third data detector being configured to produce differentially encoded data in response to said coherently demodulated data.

16. An apparatus for demodulating a carrier signal that has been differentially modulated to convey a stream of digital data symbols, said apparatus comprising:

a first data detector responsive to said carrier signal and configured to produce differentially demodulated data;

a second data detector responsive to said carrier signal and configured to produce coherently demodulated data;

means, coupled to said first and second data detectors, for selecting between said differentially demodulated and coherently demodulated data;

a first phase error detector coupled between said first data detector and said selecting means, said first phase error detector generating differential demodulation phase errors; and a second phase error detector coupled between said second data detector and said selecting means, said second phase error detector generating coherent demodulation phase errors.

17. An apparatus as claimed in claim 16 additionally comprising means, coupled to said first and second phase error detectors, for converting said differential demodulation phase errors and said coherent demodulation phase errors into differential phase error magnitude values and coherent phase error magnitude values, respectively.

18. An apparatus as claimed in claim 17 additionally comprising a filter, coupled to said converting means, for smoothing said differential phase error magnitude values and said coherent phase error magnitude values.

19. An apparatus as claimed in claim 16 wherein:

said second data detector produces a modulated phase relationship estimate of said carrier signal for a previous symbol; and said apparatus additionally comprises means for determining a difference between a received phase relationship of said carrier signal for a current symbol and said modulated phase relationship estimate for said previous symbol.

20. An apparatus as claimed in claim 16 additionally comprising a third data detector coupled between said second data detector and said selecting means, said third data detector being configured to produce differentially encoded data in response to said coherently demodulated data.

* * * * *

UNITED STATES PATENT AND TRADEMARK OFFICE
CERTIFICATE OF CORRECTION

PATENT NO. : 5,553,098

DATED : 3 September 1996

INVENTOR(S) : Bruce A. Cochran, John M. Liebetreu, Ronald D. McCallister

It is certified that error appears in the above-indentified patent and that said Letters Patent is hereby corrected as shown below:

On the title Page, Section [54]:

Amend the title from "DEMODULATOR WITH SELECTABLE COHERENT AND DIFFERENTIAL DATA" to --DEMODULATOR WITH SELECTABLE COHERENT AND DIFFERENTIAL DATA DETECTION--

Signed and Sealed this

Nineteenth Day of November, 1996

*Attest:*

BRUCE LEHMAN

*Attesting Officer*          *Commissioner of Patents and Trademarks*